United States Patent [19]
Panush

[11] Patent Number: 5,830,567
[45] Date of Patent: Nov. 3, 1998

[54] NON-METALLIC COATING COMPOSITIONS CONTAINING VERY FINE MICA

[75] Inventor: Sol Panush, Farminton Hills, Mich.

[73] Assignee: BASF Corporation, Southfield, Mich.

[21] Appl. No.: 584,974

[22] Filed: Sep. 19, 1990

[51] Int. Cl.⁶ .............................. B32B 5/16; C04B 17/20
[52] U.S. Cl. ........................ 428/324; 106/417; 427/201
[58] Field of Search ................... 428/324, 323, 428/327, 363, 402; 106/415, 417; 427/201

[56] References Cited

U.S. PATENT DOCUMENTS

| | | | |
|---|---|---|---|
| 2,860,110 | 11/1958 | Godshalk | 260/17 |
| 4,017,326 | 4/1977 | Davis | 428/324 |
| 4,048,136 | 9/1977 | Kobayashi et al. | 260/42.14 |
| 4,499,143 | 2/1985 | Panush | 428/336 |
| 4,539,258 | 9/1985 | Panush | 428/324 |
| 4,547,410 | 10/1985 | Panush et al. | 427/388.2 |
| 4,598,015 | 7/1986 | Panush | 428/324 |
| 4,598,020 | 7/1986 | Panush | 428/411.1 |
| 4,605,687 | 8/1986 | Panush | 523/171 |
| 4,615,940 | 10/1986 | Panush et al. | 428/324 |

Primary Examiner—Hoa T. Le
Attorney, Agent, or Firm—Anne Gerry Sabourin

[57] ABSTRACT

Coating compositions are disclosed having very fine mica with particle sizes ranging from 0.1 to 15 microns which produce added color to the coating without producing a metallic effect or color travel.

31 Claims, 2 Drawing Sheets

NON-METALLIC COATING COMPOSITIONS CONTAINING VERY FINE MICA

This invention relates to coating compositions, and more particularly to non-metallic compositions containing very fine mica.

Coating systems are well known in the coatings industry for coating a variety of substrates ranging from wood, plastics, composites and metal. U.S. Pat. No. 3,639,147 describes such a system for use in coating motor vehicles. Multi-coat coating systems provide metallic substrates with both the requisite protection from corrosion and marring and with pleasing decorative qualities. These two functions of coating systems are particularly important in the automobile industry where the underlying metal substrate is subjected to rigorous environmental conditions and where the appearance of the finished article is one of the most important selling features. Advances in electrocoating primer coatings have vastly improved the corrosion resistance of automobiles, while similar advances in finish coatings have provided striking new color effects and improved weather, sun, and mar resistance.

Recent years have seen the introduction of metallic, pearlescent and opalescent color effects in finish coatings for automobiles. Metallic effects, in which the appearance of sparkle is imparted to finish coatings, are achieved by the introduction into one or more layers of the finish coating of finely divided metallic flake or mica particles. Typical systems of this type are disclosed in U.S. Pat. Nos. 4,048,136; 4,499,143; and 4,605,687. Pearlescent or opalescent color effects are achieved by introducing into one or more layers of the finish coating of particles of mica which have been previously encapsulated in a thin layer of a metal oxide such as iron oxide or titanium dioxide. Typical systems of this type are disclosed in U.S. Pat. Nos. 4,539,258; 4,547,410; 4,551,491; 4,598,015; 4,598,020; and 4.615,940.

Coating compositions have been applied to substrates in multiple layers to provide protection of the substrate and for aesthetic qualities. Mica having particle sizes in the range of about 25 to about 50 micron have been used in coating composition to add or improve color. However, when mica having particle sizes ranging from about 25 to about 50 micron are added to coating compositions they also produce a metallic appearance and color travel. Color travel (observance of a shift in hue at varying angles of view) is produce by the repeated reflection of light within the coating. In such systems, light travels into the coating to strike colored pigment bouncing in an upwardly direction to strike a particle of mica then bounces back downwardly to strike another colored pigment and so on. When an observer views such systems moving away from a ninety degree angle, there is seen system opalescent or sparkle effect of the mica and a shift in hue from that observer at a ninety degree angle.

In coating systems in which mica, having a particle size of about 25 micron, have been incorporated into a base coat having organic pigments, a ceramic effect is acheived wherein the coating appears as a smooth, creamy or silky color of low intensity with a slight appearance of opalescent or sparkle effect. However, the use of those size mica in such systems does not add color to the coating.

In coating systems in which mica, having a particle size of about 50 microns, have been incorporated into a base coat, a metallic look of sharp glaring colors with distinctive color travel is produced.

In nonmetallic coating systems, attempts to add color by increasing the pigment loading have been unsuccessful. In addition to being costly, increased pigments loading fails to add color but instead produces a smoky or hazy effect with loss of depth.

Thus, heretofore a need existed for a coating system and method of producing the same which provides a non-metallic coating having a gentle liquid appearance with great depth and added color.

SUMMARY OF THE INVENTION

Generally, this invention includes a non-metallic coating composition containing a polymeric binder, a pigment having a sufficient amount of mica so that the mica produces added color to the coating without producing an opalescent or metallic effect, or color travel.

Another embodiment of the invention includes a non-metallic coating composition containing a polymeric binder, a pigment including mica having a particle size ranging from about 0.1 microns to about 15.0 microns.

Another embodiment of the invention includes a substrate coated with a non-metallic coating composition containing a polymeric binder, a pigment having a sufficient amount of mica so that the mica produces added color to the coating without producing an opalescent or metallic effect, or color travel.

Another embodiment of the invention includes a method of adding color to a non-metallic coating composition including the steps of adding a sufficient amount of mica to a polymeric binder containing a pigment so that the mica produces added color to the coating upon curing without producing a opalescent or metallic effect, or color travel.

Another embodiment of the invention includes a method of making a coating composition including the steps of preparing a polymeric binder, preparing a pigment containing mica having a particle size ranging from about 0.1 to about 15.0 microns, and blending the polymeric binder with the pigment.

Another embodiment of the invention includes a method of using mica to improve the color of a coated substrate without producing a opalescent or metallic effect, or color travel, including thus steps of preparing a polymeric binder, preparing a pigment containing a sufficient amount a mica having a particle size ranging from about 0.1 to about 15.0 microns to add color to the pigment upon blending with the polymeric binder; blending the polymeric binder with the pigment to form a coating; applying the coating to a substrate, and curing the coating on the substrate.

The coating composition of the invention incorporates a very fine mica into a non-metallic color coating therein sharp-bright aesthetics are softened and subdued yielding a gentle liquid appearance with great depth without producing a opalescent or metallic effect, or color travel. These and other advantages will be apparent from the following description and appended claims..

Figure 1:
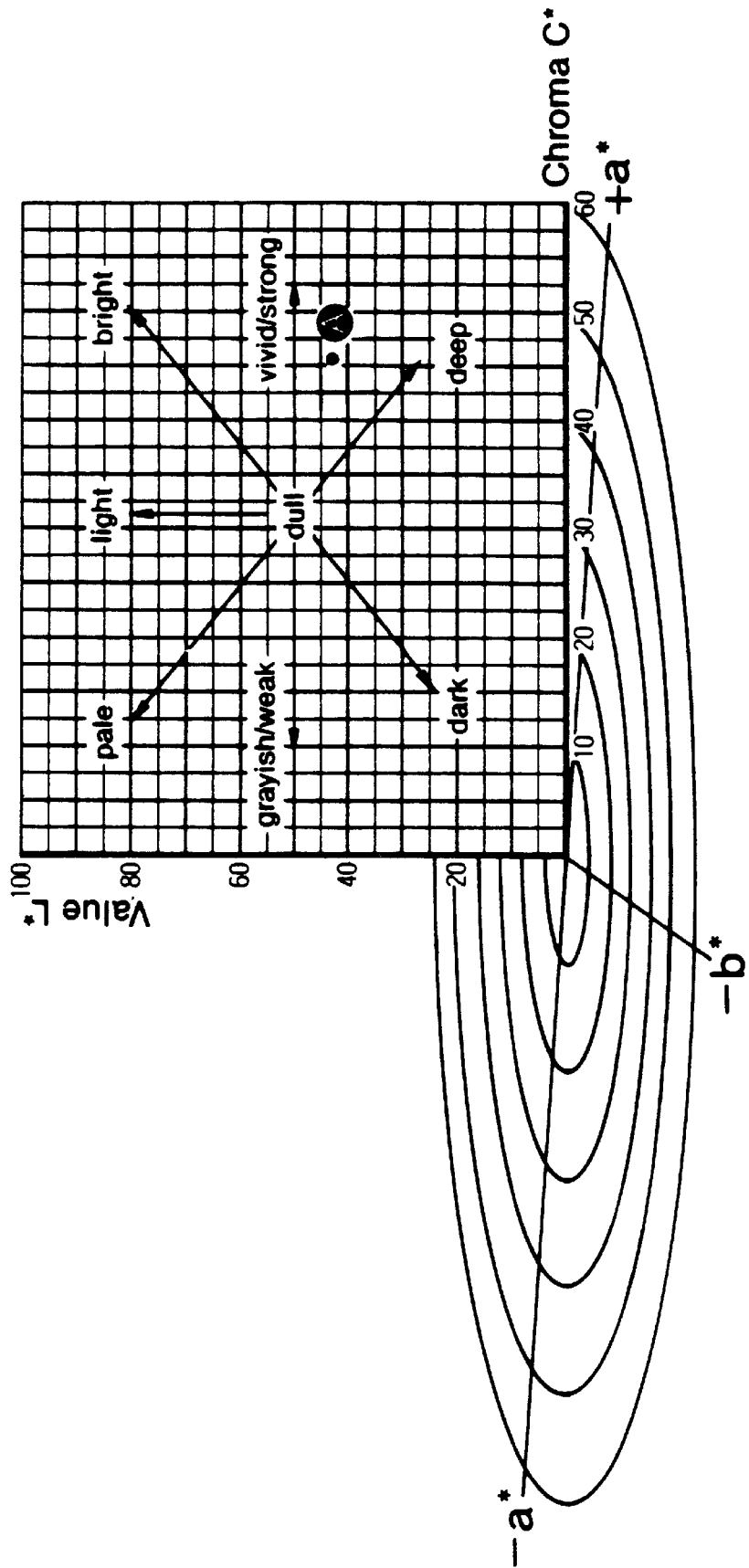
FIG. 1 is a section through the CIE 1976 (L*, a*, b*) color space diagram showing color value (L*) on the vertical axis and hue (a* and b*) on the horizontal axes.

Mica is one of a group of laminated silica minerals. The mica used in the present invention have a particle size length ranging from about 0.1 to about 15.0 microns, and a thickness ranging from about 0.1 to about 1 microns. The amount of the mica that can be incorporated into the coating composition to achieve the added color without the appearance of a opalescent or metallic is dependent on the particle size of the mica. These advantages can be achieved when:

approximately 100% or less of the pigment in the composition is mica and wherein approximately 98.5% of the mica has a particle size equally to or less than 0.1 microns; approximately 75% or less of the pigment in the composition is mica and wherein approximately 98.5% of the mica has a particle size equal to or less than 5.0 microns; approximately 50% or less of the pigment in the composition is mica and wherein approximately 98.5% of the mica has a particle size equal to or less than 10.0 microns; and approximately 25% or less of the pigment in the composition is mica and wherein approximately 98.5% of the mica has a particle size equal to or less than 15.0 microns. For the purpose of describing this invention the term particle size means the length of the mica particle.

In addition to the above described advantages, the use of mica in the context of this invention produces other advantages. These plate-like mica particles with a diameter to thickness ratio of approximately 25:1 contribute enhanced physical properties to the non-metallic coating composition. The mica's natural tendency to align themselves parallel to the surface of the coating presents are inert and flexible shield against chemical attack and solar radiation. The flake of mica serve as foci for the release of stresses in the coating film caused by expansion and contraction of the coating film and the surface on which it is applied. These mica flakes provide enhanced properties such as washability, adhesion, film life, as well as resistance to chalking, checking and corrosion. The total overall effect of very fine mica in non-metallic coatings is the production of unique and novel aesthetics with vastly improved physical properties of the cured coating. Both the aesthetics and the physical properties of the present invention add a new dimension to non-metallic coatings which heretofore could not be obtained.

Any substrate material can be coated with the coating systems of the present invention, including such materials as glass, ceramics, wood, plastics, and composites, depending upon the drying and/or curing requirements of the particular coating compositions used in the system. However, the coating system of the present invention is particularly adapted for metallic substrates, and specifically as an automotive paint finish system. The substrate may be bare substrate material or, in the case of metal substrates, may be pretreated to impart corrosion resistance as by phosphatizing, electrocoating, priming or other similar treatment.

Examples of metallic substrates which can be coated with the coating system of the present invention include steel, aluminum, copper, magnesium, alloys thereof, etc. The chemical components of the coating system of this invention can be varied to suit the temperature tolerance of the substrate material. For example, in the case of plastic substrates, the components are constituted for air drying, or for drying at ambient temperature or curing at low temperatures, e.g. 150° F.–180° F. (65° C.–82° C.). Alternatively, in the case of metallic substrates and other substrate materials which can tolerate higher temperatures, the components of the present coating system are constituted for curing at higher temperatures e.g. over 180° F. (82° C.).

The base coat material, i.e. the pigmented polymer layer closest to the substrate, comprises any suitable film forming material conventionally used in this art, metallic flake pigment, and a colorant or pigmenting agent. Suitable film forming materials for use in formulating the colored basecoat compositions include acrylics, alkyds, polyurethanes, polyesters and aminoplast resins. Although the base coat can be deposited out of an aqueous carrier, it is preferred to use conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. When using volatile organic solvents, although it is not required, it is preferred to include from about 2% to about 50% by weight of a cellulose ester and/or wax (e.g. poly-ethylene) which facilitates quick release of the volatile organic solvent resulting in improved flow or leveling out of the coating. The cellulose esters used must be compatible with the particular resin systems selected and include such things as cellulose nitrate, cellulose propionate, cellulose butyrate, cellulose acetate butyrate, cellulose acetate propionate, and mixtures thereof. The cellulose esters when used are preferably used in about 5% to about 20% by weight based on film forming solids. The acrylic resins in the base coat may be either thermoplastic (acrylic lacquer systems) or thermosetting. Acrylic lacquers such as are described in U.S. Pat. No. 2,860,110 are one type of film forming composition useful according to this invention in the base coat. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like.

When the relative viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalescing temperatures.

Another type of film forming material useful in forming the base coat of this invention is a combination of a cross-linking agent and a carboxy-hydroxy acrylic copolymer. Monomers that can be copolymerized in the carboxy-hydroxy acrylic copolymer include esters of acrylic and methacrylic acid with alkanols containing 1 to 12 carbon atoms, such as ethyl acrylate, methyl methacrylate butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, α-methyl styrene, vinyl acetate, and so forth. These monomers contain one polymerizable ethylenically unsaturated group and are devoid of hydroxyl and carboxylic groups.

The cross-linking agents used in combination with the hydroxy-carboxy copolymers are those compositions which are reactive with hydroxy and/or carboxylic acid groups. Examples of such cross-linking agents are polyisocyanates (typically di-and/or triisocyanates) polyepoxides and aminoplast resins. Particularly preferred cross-linking agents are the aminoplast resins.

The polyisocyanates when reacted with hydroxyl bearing polyester or polyether or acrylic polymers will yield urethane films useful in the process of this invention in both the base coat and topcoat. The isocyanate (—N═C═O)— hydroxyl (—OH) reaction takes place readily at room temperature, so that ambient and low temperature cure is possible.

Among other resins useful in the base coat are those commonly known as alkyd resins which are defined to include fatty acid or oil containing esterification products. The methods for preparing these resins are well known in the art. The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5% fatty compound are classified as the "oil-less" alkyd resins of polyester resins described hereinafter. On the other hand, alkyd resins containing greater than 65% of a fatty compound exhibit poor baking properties, poor chemical resistance and unsatisfactory adhesion to either the base coat or the substrate. When the hydroxyl to carboxy equivalent ratio is less than about 1.05 gelation can result during polymer preparation while resins prepared having a ratio in excess of 1.75 have low molecular weights and therefore poor chemical resistance. These alkyd resins can also be used as the topcoat of this invention. When this is the case it is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils: castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4-butanediol, hexylene glycol, 1,6-hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include mono-functional acids such as rosin acids, benzoic acid, p-tert-butyl benzoic acid and the like: the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful base coat is prepared using nonaqueous dispersions such as are described in U.S. Pat. Nos. 3,050,412; 3,198,759; 3,232,903; and 3,255,135. Typically these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor chemical resistance, durability and mechanical properties. The monomers useful in preparing the above-dispersed copolymers or homopolymers are those listed previously as useful in forming the carboxyhydroxy acrylic copolymers.

In another instance the base coat film can be produced from resins known as polyesters or "oil-less" alkyd resins. These resins are prepared by condensing nonfatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Mono basic aids such as benzoic, p-tert-butylbenzoic and the like can also be utilized. Among the polyalcohols are the diols or glycols such as propylene glycol, ethylene glycol, bytylene glycol, 1,4-butanediol, neopentyl glycol, hexylene glycol, 1,6-hexanediol, and the like; the triols such as trimethylolethane, trimethylolpropane and glycerine and various other higher functional alcohols such as pentaerythritol.

The total pigmenting solids in the basecoat will generally range between about 1 percent by weight to about 50 percent by weight of the total non-volatile solids content of the base coat layer. The pigment or coloring agent incorporated into the base coat layer may be any organic or inorganic pigmenting agent known to those skilled in the coatings arts. Organic pigments are preferred because of their higher chromaticity, but in the base coat layer inorganic pigments may be employed, either alone, or in combination with organic pigments to obtain the desired hiding of the substrate. Representative examples of inorganic pigments which may be used in the base coat layer include titanium dioxide, opaque yellow oxide, molybdate orange, opaque red oxide, iron blue, carbon black, and hydrate chrome oxide. Representative examples of organic pigments which may be employed include phthalocyanine green, phthalocyanine blue, anthrapyrimidine yellow, flavanthrone yellow, imidazole orange, quinacridrone red, carbazole dioxazine violet, indanthrene blue, azo browns, isoindolinones, and high molecular weight azo pigments.

The base coat pigmenting agent or colorant is preferably added to the polymer binder in such amounts so as to sufficiently hide of the substrate. The pigment to binder ratio in the base coat composition will vary with the chroma and hiding power of the particular pigment chosen. The base coat can be of any hue as long as it possesses sufficient chromaticity and hiding power. Generally, the amount of pigmenting or coloring agent in the base coat comprises about 1.0% to about 50.0% by weight, preferably about 10% to about 40% and typically about 20% to about 30% by weight, based on total solids of the basecoat.

Referring to FIG. 1, there is shown a simplified section through the CIE 1976 (L*, a*, b*) color space diagram based on the color measurement system introduced by Richard S. Hunter, "Photoelectric Tristimulus Colorimetry with Three Filters," National Bureau of Standards Circular 429, United States Government. Printing Office, 1942, reprinted in *J. Opt. Soc. Am.*, 32, 509–538 (1942) which is incorporated herein by reference. A particular color can be completely described by defining its value (lightness), hue (color), and chroma (degree of color saturation). In this system the value of a color, L*, corresponds to its lightness and ranges from zero (black) to one hundred (white). The hue of a color is designated by values of a* and b*, with a* corresponding to redness (if a* is positive) or greenness (if A* is negative), and yellowness (if b* is positive) or blueness (if b* is negative). The chroma of the color is designated C* and is equal to the square root of the sum of the squares of a* and b*.

In FIG. 1, the value (L*) of a color is measured on the vertical axis, while a* and b* are measured as points on a rectangular coordinate system in the plane horizontal to the L* axis. Chroma (C*) is measured by the perpendicular distance from the L* axis to the point fixed by a* and b*. For example, in FIG. 1, the color represented by point A is shown having a value of L*=44, and a hue represented by a*=45 and b*=10. The chroma, or degree of saturation of this color is thus $(45^2+10^2)^{0.5}=46.10$.

As can be seen further from FIG. 1, the common descriptions of colors can be derived from the value and chroma of a color. For example, colors of a particular hue can be "bright" (high value and chroma), "vivid" (high chroma, medium value), "deep" (low value and high chroma), "dark" (low value and chroma), "weak" (low chroma, medium value), "pale" (high value and low chroma), or "light" (high value, moderate chroma). Colors of intermediate value tend toward grayishness or weakness as their chroma decreases.

Figure 2:
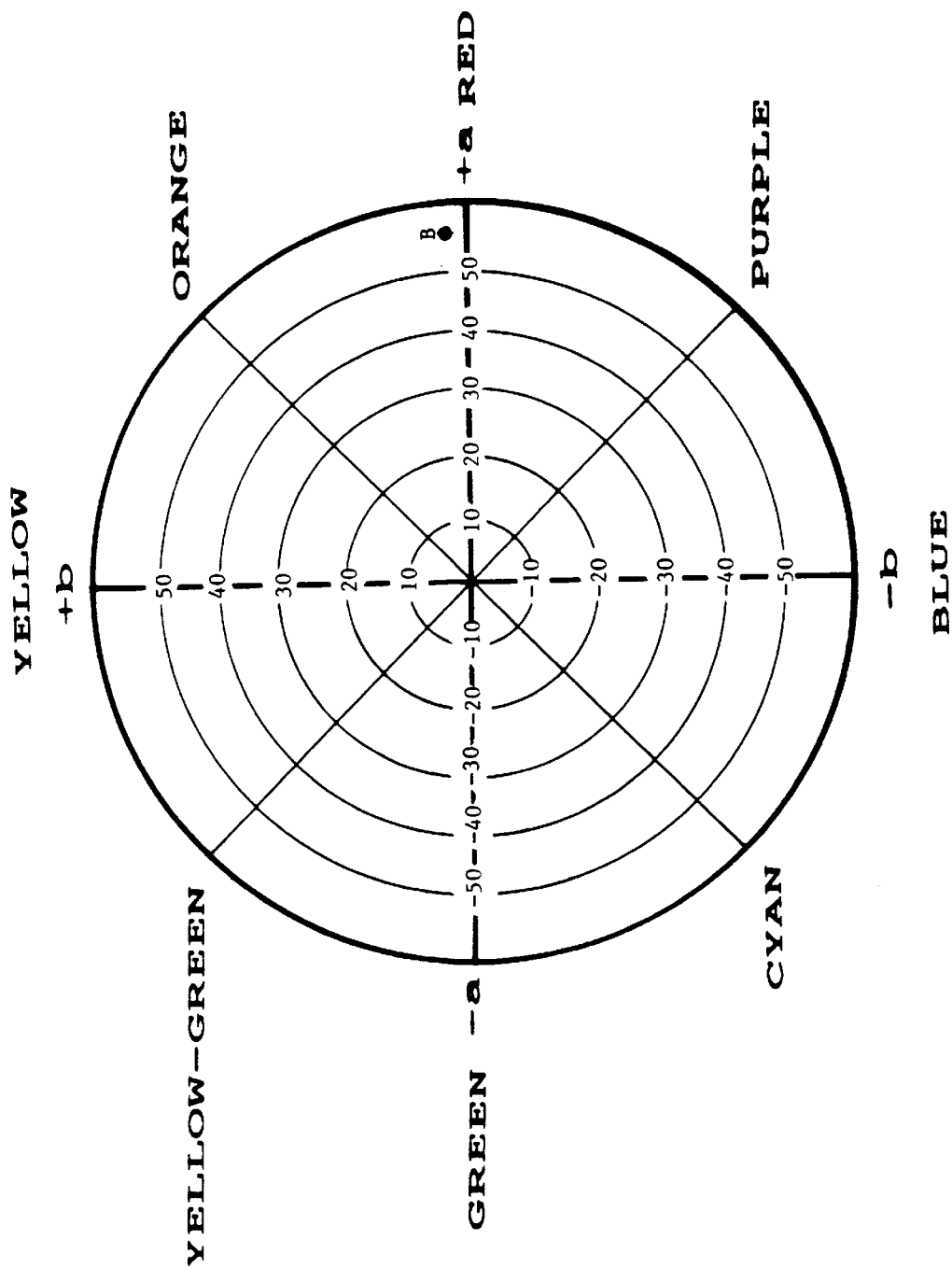
FIG. 2 is a view of the section of the CIE 1976 (L*,a*,b*) color space diagram of FIG. 1 along the L* axis.

Referring to FIG. 2, a horizontal section through the CIE 1976 (L*, a*, b*) color space diagram at constant L* is shown. The common names of the colors are shown around the periphery of the graph.

Utilizing the compositions of the present invention offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat over a pigmented thermoplastic acrylic lacquer base or interference coat (although acrylic lacquers may be used for all layers). Likewise, in appliance finishes the chemical resistance of polyester resins can be combined with the lower cost of thermosetting acrylic resins by applying a polyester clear topcoat over a pigmented thermosetting acrylic base or interference coat. Although any of the above-mentioned thermoplastic materials may be used to form the transparent topcoat, better durability is achieved if the topcoat is one of the above-cited thermosetting materials, i.e. the material containing the cross-linking agents. In all instances where the above methods and compositions are used extremely high gloss films result. In fact, using the process of this invention gloss readings in excess of 100 are readily obtained.

Typically, a substrate may be coated with several layers. First, an electrodeposition coating may be applied directly to the substrate. Over the electrodeposition coating may be applied a primer, and over the primer a sealer may be applied. The base coat may be applied directly over the substrate or over any one or combination of the above described layers. The primary purpose of the base coat is to provide hiding of the substrate and underlying coating and to provide aesthetic qualities to the coating. A pigmented interference coat may be applied over the base coat for aesthetic qualities. A clear or tinted top coat may be applied over the base coat or the interference coat.

The base coat, intermediate coat and the topcoat can be applied by any conventional methods in this art such as brushing, spraying, dipping, flow coating etc. Typically spray application is used, especially for automotive finishing. Various types of spraying can be utilized such as compressed air spraying, electrostatic spraying, hot spraying techniques, airless spraying techniques etc. The transparent intermediate coat is typically applied from about 0.4 mil to about 2.0 mils and preferably about. 0.5 mil to about 0.8 mil. This thickness can be applied in a single coating pass or a plurality of passes with very brief drying ("flash") between applications of coats. The application of the coating layers generally follow the application to the substrate of a conventional corrosion resistant primer or electrocoat. To this primed substrate is applied the base coat. The base coat is typically applied from about 0.4 mil to about 2.0 mils and preferably about 0.5 mil to about 0.8 mil. This thickness can be applied in a single coating pass or a plurality of passes with very brief drying ("flash") between applications of coats.

Once the base coat has been applied, the transparent interference coats and topcoats are applied after allowing the base coat to flash at ambient temperature for about 30 seconds to about 10 minutes, preferably about one minute to about three minutes. Similar drying delays are allowed between applications of the interference coat and the topcoat. While the respective coats can be dried for longer periods of time, even at higher temperatures, a much improved product is produced by application of the successive coats after only a brief flash ("wet-on-wet). Some drying out of the preceding coat is necessary to prevent total mixing of the respective coats. However, a minimal degree of interaction is desirable for improved bonding of the coatings. The topcoat is applied thicker than the preceding coats (preferably about 1.8 mils to 2.3 mils) and can also be applied in a single or multiple pass.

The term transparent film is defined as film through which the base coat and interference coat can be seen. As stated above it is preferred that the transparent film contain a UV absorbing compound and/or hindered amine UV stabilizer and be substantially colorless so that the full polychromatic and aesthetic effect of the basis coat-interference coat is not substantially decreased. The outstanding feature of the topcoat is the significant improvement in the durability which is provided to the overall coating. The total dry film thickness for this multi-layered coating system is typically about 3.1 mils to 4.9 mils and preferably about 3.7 mils. Sufficient wetting takes place at the interface of the respective coatings so that no problem with delamination or solvent release from either coating is incurred.

Once the successive coats are applied the entire system is again flashed for about 30 seconds to about 10 minutes and the total coatings are then baked at a temperature sufficient to drive off all of the solvent in the case of thermoplastic layers and a temperature sufficient to cure and cross-link in the case of than thermosetting layers. These temperatures can range anywhere from ambient temperature to about 400° F. (205° C.). Typically in the case of thermosetting material temperatures of about 225° F. to about 280° F.(for example 250° F.) are used (e.g. for about 30 minutes).

The compositions and processes according to the present invention provide many improvements over the paint compositions and processes of the prior art. Unique color effects and better hiding of surface defects can be produced. Weather durable color effected are produced not available with other pigment systems while maintaining an appealing and desirable soft, lustrous appearance.

The applied compositions are not moisture sensitive, are less sensitive to criticality of applications, can withstand the elements (i.e. sun exposure), do not operate with subtractive color effects when mixed with other pigments, allow low bake repair color matching, and resist settling and chemical (e.g. acid rain) attach.

It should be noted that while the compositions of the present invention are particularly adapted for original equipment manufacture coatings for automobiles, one of their advantages is the low bake matching use as refinish compositions as well. Whereas in original equipment manufacture the disclosed cellulose esters and/or wax are typically used, such are not universally required, for example, in refinish compositions. Also, where the thermosetting polymer embodiments are preferred in the original equipment manufacture, in refinish either low temperature cure thermosetting materials e.g. 150° F.–180° F. (66° C.–82° C.) or ambient temperature cure thermosetting or thermoplastic materials are preferred.

The following example illustrates selective embodiments of the invention.

EXAMPLE 1

In this example, coating compositions maybe prepared according to the formulations of Table I, cured on a metal substrate in a manner described above.

TABLE I

| MICA TO PIGMENT RATIO (BY WT.) | *10/90 | *25/75 | *50/50 | *75/25 | *90/10 | CONTROLS* A | B | C |
|---|---|---|---|---|---|---|---|---|
| RO U578 | 13.70 | 12.76 | 11.94 | 10.28 | 10.28 | 9.25 | 9.25 | 9.25 |
| 349CE1927 | 20.05 | 18.39 | 17.93 | 16.17 | 12.23 | 6.96 | 2.91 | 5.96 |
| 360CE0183 | 16.22 | 15.09 | 14.12 | 12.16 | 12.16 | 10.94 | 10.94 | 10.94 |
| VERY FINE MICA | 1.30 | 3.88 | 8.87 | 16.67 | 20.00 | | | |
| 769WL3120 (R960) | 17.94 | 17.91 | 13.65 | 8.54 | 3.41 | 39.06 | 35.16 | 35.16 |
| R08097 PASTE | | | | | | | | 4.81 |
| PU RED PASTE | | | | | | | 12.50 | |
| DS 2526 | .88 | .84 | .76 | .68 | .68 | .60 | .60 | .60 |
| SA0137 | 4.00 | 4.00 | 4.00 | 4.00 | 4.00 | 4.00 | 4.00 | 4.00 |
| SR0708 | 26.73 | 27.13 | 28.73 | 31.50 | 37.24 | 29.19 | 24.64 | 29.28 |
| | 100.00 | 100.00 | 100.00 | 100.00 | 100.00 | 100.00 | 100.00 | 100.00 |
| % PIGMENT (BY WT.) | 12.96 | 15.52 | 17.74 | 22.22 | 22.22 | 25.00 | 25.00 | 25.00 |
| % SOLID VEHICLE (BY WT.) | 37.04 | 34.48 | 32.26 | 27.78 | 27.28 | 25.00 | 25.00 | 25.00 |
| TOTAL NON-VOLATILE % (BY WT.) | 50.00 | 50.00 | 50.00 | 50.00 | 50.00 | 50.00 | 50.00 | 50.00 |

*A is 100% R960
B is 95% R960 and 5% PuRed paste
C is 98% R960 and 2% R08097

WHERE:
RU0578 IS—RESIMENE X755 AVAILABLE FROM—MONSANTO
349CE1927 IS—ACRYLIC RESIN AVAILABLE FROM—BASF
360CE0183 IS—MICROGEL AVAILABLE FROM—BASF
769WL3120 IS—WHITE PASTE AVAILABLE FROM—BASF
SAHARA BEIGE/9-514 IS—VERY FINE MICA AVAILABLE FROM—E. M. INDUSTRIES
DS 2526 IS—NACURE 5225 AVAILABLE FROM—ROHM & HAAS
SA0137 IS—ETHANOL AVAILABLE FROM—ASHLAND CHEMICAL
SR0708 IS—XYLENE AVAILABLE PROM—ASHLAND CHEMICAL
R960 IS—RUTILE PIGMENTARY TIO2, MANUFACTURED BY E. I. DUPONT DE NEMOURS & COMPANY, WILMINGTON, DEL.
RO8097 IS—OPAQUE RED IRON OXIDE, MANUFACTURED BY PFIZER PIGMENTS INC., 2001 LYNCH RD., EAST ST. LOUIS, Mo.
9-514 IS—VERY FINE MICA AVAILABLE FROM E. M. INDUSTRIES
PU RED IS—TRANSPARENT RED OXIDE AVAILABLE FROM PAUL UHLICH INC

Colorimetry measurements were made of the samples prepared as described in Table I for fine mica containing coatings, and are presented in Table II and III. Control samples containing no mica were measured as presented in Table II and III. Control samples maybe prepared as described in Table I. Table II and III illustrate the effect of very fine mica on the value of chroma, and purity as compared to conventional non-metallics.

TABLE II

| SYSTEM | L* | a* | b* |
|---|---|---|---|
| 100% R960 (STD) | 96.50 | −2.01 | 2.24 |
| 10% SAHARA BEIGE/90% R960 | 82.82 | 6.76 | 13.24 |
| 25% SAHARA BEIGE/75% R960 | 76.27 | 10.65 | 16.28 |
| 50% SAHARA BEIGE/50% R960 | 70.20 | 13.19 | 19.66 |
| 75% SAHARA BEIGE/25% R960 | 66.80 | 12.02 | 18.67 |
| 90% SAHARA BEIGE/10% R960 | 62.51 | 12.33 | 19.89 |
| 5% PU RED/95% R960 (STD) | 74.25 | 16.44 | 24.69 |

TABLE III

| SYSTEM | L* | a* | b* |
|---|---|---|---|
| 100% R960 (STD) | 96.50 | −2.01 | 2.24 |
| 10% 9-514/90% R960 | 78.35 | 7.32 | 3.06 |
| 25% 9-514/75% R960 | 67.56 | 11.91 | 4.86 |
| 50% 9-514/50% R960 | 55.44 | 18.35 | 8.31 |
| 75% 9-514/25% R960 | 50.99 | 21.32 | 9.33 |
| 90% 9-514/10% R960 | 46.18 | 25.39 | 12.95 |
| 2% R08097/98% R960 (STD) | 78.90 | 11.10 | 5.95 |

NOTE:
Decrease in the L* numbers indicates an increase in value.
Increase in the a* numbers indicates increase in red.
Increase in the b* numbers indicates an increase in the yellow.

The ranges described herein are intended to convey the invention as including the range broadly described and including any subrange or combination of subrange within the broadly defined range.

Although this invention has been shown and described with respect to detailed embodiments thereof, it will be understood by those skilled in the art that various changes in form and detail thereof may be made without departing from the spirit and scope of the claimed invention.

We claim:

1. A non-metallic coating composition comprising a polymeric binder, and a pigment comprising a mica in an amount so that mica produces added color without producing an opalescent or metallic effect or color travel, wherein said pigment is selected from the group consisting of:
   pigments containing not more than 100% mica, wherein at least 98.5% of said mica has a particle size not greater than 0.1. microns,
   pigments containing not more than 75% mica, wherein at least 98.5% of said mica has a particle size not greater than 5.0 microns, pigments containing not more than 50% mica, wherein at least
   98.5% of said mica has a particle size not greater than 10.0 microns,
   and pigments containing not more than 25% mica, wherein at least 98.5% of said mica has a particle size not greater than 15.0 microns.

2. A non-metallic coating composition as set forth in claim 1 wherein said pigment comprises at least 10% mica.

3. A non-metallic coating composition as set forth in claim 1 wherein not more than 100% of said pigment comprises mica and wherein at least 98.5% of said mica comprises particles having a size not greater than 0.1 microns.

4. A non-metallic coating composition as set forth in claim 1 wherein not more than 75% of said pigment comprises mica and wherein at least 98.5% of said mica comprises particles having a size not greater than 5.0 microns.

5. A non-metallic coating composition as set forth in claim 1 wherein not more than 50% of said pigment comprises mica and wherein at least 98.5% of said mica comprises particles having a size not greater than 10.0 microns.

6. A non-metallic coating composition as set forth in claim 1 wherein not more than 25% of said pigment is mica and wherein 98.5% of said mica comprises particles having a size not greater than 15.0 microns.

7. A non-metallic basecoat coating composition comprising a polymeric binder, and a pigment comprising mica having a particle size length ranging from 0.1 to 15.0 microns, and a particle size thickness ranging from 0.1 to 1 micron, wherein the mica produces added color without metallic effect or color travel.

8. A non-metallic coating composition as set forth in claim 7 wherein said mica has a particle size ranging from 0.1 to 10.0 microns.

9. A non-metallic coating composition as set forth in claim 7 wherein said mica has a particle size ranging from 0.1 to 5 microns.

10. A non-metallic coating composition as set forth in claim 7 wherein said mica has a particle size of 0.1 microns.

11. A non-metallic coating composition as set forth in claim 7 wherein said pigment comprises not more than 75% mica and wherein at least 98.5% of said mica has a particle size not greater than 5.0 microns.

12. A non-metallic coating composition as set forth in claim 7 wherein said pigment comprises not more than 50% of mica and wherein at least 98.5% of said mica has a particle size not greater than 10.0 microns.

13. A non-metallic coating composition as set forth in claim 7 wherein said pigment comprises not more than 25% mica and wherein at least 98.5% of said mica has a particle size not greater than 15.0 microns.

14. A non-metallic coating composition as set forth in claim 7 wherein said pigment comprises at least 10% mica.

15. A substrate coated with a non-metallic coating composition comprising a polymeric binder and a pigment comprising a mica of a particle size and in an amount so that said mica produces added color without producing an opalescent or metallic effect or color travel, said mica having a particle size ranging from 0.1 to 15.0 microns, and a thickness ranging from 0.1 to 1 micron.

16. A substrate as set forth in claim 15 wherein not more than 100% of said pigment comprises mica and wherein at least 98.5% of said mica comprises particles having a size not greater than 0.1 microns.

17. A substrate as set forth in claim 15 wherein not more than 75% of said pigment comprises mica and wherein at least 98.5% of said mica comprises particles having a size not greater than 5.0 microns.

18. A substrate as set forth in claim 15 wherein not more than 50% of said pigment comprises mica and wherein at least 98.5% of said mica comprises particles having a size not greater than 10.0 microns.

19. A substrate as set forth in claim 15 wherein not more than 25% of said pigment is mica and wherein 98.5% of said mica comprises particles having a size not greater than 15.0 microns.

20. A substrate having a non-metallic basecoat adhered thereto, said basecoat comprising a polymeric binder, and a pigment comprising mica having a particle size length ranging from 0.1 to 15.0 microns, and a thickness ranging from 0.1 to 1 micron, wherein the mica produces added color without metallic effect or color travel.

21. A substrate having a non-metallic basecoat adhered thereto, said basecoat comprising a polymeric binder, and a pigment comprising 10% to 100% mica, said pigment being at least one selected from the group consisting of:
   pigments containing less than 100% mica, 98.5% of said mica having a particle size of 0.1 microns or less;
   pigments containing less than 75% mica, 98.5% of said mica having a particle size of 5.0 microns or less;
   pigments containing less than 50% mica, 98.5% of said mica having a particle size of 10.0 microns or less; and
   pigments containing less than 25% mica, 98.5% of said mica having a particle size of 15.0 microns or less,
wherein the mica produces added color without metallic effect or color travel.

22. A method of adding color to a non-metallic coating composition comprising the steps of:
   adding a sufficient amount of mica pigment to a coating composition comprising a polymeric binder and an optional second pigment so that said mica adds color to the coating without producing an opalescent or metallic effect or color travel, wherein said mica is chosen so that:
   when the total pigment in said coating composition comprises not more than 100% mica, at least 98.5% of said mica has a particle size not greater than 0.1 microns,
   when the total pigment in said coating composition comprises not more than 75% mica, at least 98.5% of said mica has a particle size not greater than 5.0 microns,
   when the total pigment in said coating composition comprises not more than 50% mica, at least 98.5% of said mica has a particle size not greater than 10.0 microns,
   when the total pigment in said coating composition comprises not more than 25% mica, at least 98.5% of said mica has a particle size not greater than 15.0 microns.

23. A method as set forth in claim 22 wherein said step of adding said mica comprises first blending said mica with said pigment to form a pigment component and then blending said pigment component with said polymeric binder to form said coating.

24. A method as set forth in claim 22 further including the step of selecting said mica so that said mica has a particle size ranging from 0.1 to 15.0 microns.

25. A method as set forth in claim 22 further including the step of selecting said mica so that all of said total pigment comprises mica and wherein at least 98.5% of said mica comprises particles having a size not greater than about 0.1 microns.

26. A method as set forth in claim 22 further including the step of selecting said mica so that not more than 75% of said total pigment comprises mica and wherein at least 98.5% of said mica comprises particles having a size not greater than about 5.0 microns.

27. A method as set forth in claim 22 further including the step of selecting said mica so that not more than 50% of said total pigment comprises mica and wherein at least 98.5% of said mica comprises particles having a size not greater than 10.0 microns.

28. A method as set forth in claim 22 further including the step of selecting said mica so that not more than 25% of said total pigment comprises mica and wherein at least 98.5% of said mica comprises particles having a size not greater than 15.0 microns.

29. A method of making a non-metallic basecoat coating composition comprising the steps of preparing a polymeric binder, and preparing a pigment comprising mica having a particle size ranging from 0.1 to 15.0 microns, and blending said binder and said pigment, wherein the mica produces added color without metallic effect or color travel.

30. A method as set forth in claim 29 wherein said step of preparing said pigment further includes controlling the size of said mica in a range from 0.1 to 10.0 microns.

31. A method as set forth in claim 29 wherein the step of preparing said pigment further includes the step of controlling the size of said mica in a range from 0.1 to 5.0 microns.

* * * * *